United States Patent [19]

Stewart et al.

[11] Patent Number: 4,493,229
[45] Date of Patent: Jan. 15, 1985

[54] FORMING OF EXTRUSION DIES

[75] Inventors: David E. Stewart, Down Hatherly; George R. Nicholson, Swindon Village, both of England

[73] Assignee: Hobson Limited, Cheltenham, England

[21] Appl. No.: 498,097

[22] Filed: May 25, 1983

[30] Foreign Application Priority Data

May 25, 1982 [GB] United Kingdom ............... 8215216

[51] Int. Cl.³ .................... B21K 5/20; B21C 25/10; B21C 25/02
[52] U.S. Cl. .................................. 76/107 A; 72/467
[58] Field of Search ................. 76/107 R, 107 A; 72/467

[56] References Cited

FOREIGN PATENT DOCUMENTS 55-141320 11/1980 Japan ................................. 72/467
712160 1/1980 U.S.S.R. ............................. 72/467

Primary Examiner—Roscoe V. Parker
Attorney, Agent, or Firm—Young & Thompson

[57] ABSTRACT

A method of forming an extrusion die comprises forming an extrusion aperture in a die piece, forcing a flowable material partly through the extrusion aperture so that the leading surface of the material becomes deformed in the extrusion direction, and then removing the exposed surface of the extrusion aperture, by chemical or electro-etching, so that the effective axial bearing depth of the extrusion aperture at any location around its periphery corresponds to the deformation of the leading surface of the flowable material at that location. The axial bearing depth of the completed die at any location is thus inversely proportional to the resistance to flow at that location, resulting in substantially uniform flow over the whole of the die aperture.

10 Claims, 5 Drawing Figures

FORMING OF EXTRUSION DIES

BACKGROUND OF THE INVENTION

The invention relates to the forming of extrusion dies, such as dies used for extruding aluminium.

It is well known that in an extrusion die which is of substantially constant axial bearing depth between the inlet and outlet, the resistance to the flow of material through the die varies in different parts of the die aperture in accordance with the shape of the aperture. For example, the resistance to flow between two opposed parallel walls will be generally inversely proportional to the spacing between the walls. In addition, the extruding pressure normally varies across the die aperture. These variations in the resistance to flow and extrusion pressure in different parts of the die aperture lead to different rates of flow in the material being extruded, leading in turn to severe internal stresses in the material. It would therefore be advantageous if an extrusion die could be so designed that the rate of flow of the material being extruded was substantially uniform over the whole area of the aperture.

It is known that the resistance to flow in any part of an extrusion die may be reduced by reducing the axial bearing depth of the aperture, or increased by increasing the bearing depth. It has accordingly been the practice to design extrusion dies so that the bearing depth is reduced in areas where the shape of the aperture is such that resistance to flow will be high, and/or where the extrusion pressure is low. However, there has hitherto been no readily available method of determining how precisely the bearing depth should be varied over the die aperture to achieve the required effect. Instead the design of dies has depended on the judgment and experience of the designer followed by trial and error testing and modification of the die. This is obviously time consuming and, at best, can achieve only an approximate result.

It has been proposed that the required correlation between the shape of a die aperture and its bearing depth might be determined by computer analysis and while it is probable that this could provide a solution, a great deal of work is likely to be involved in writing the necessary programs and, in any case, the use of expensive computer equipment is necessary. Furthermore, even when the required dimensions of the die aperture have been thus determined, the necessary shaping of the die in accordance with the computed requirements is likely to be difficult.

The present invention provides a simple method of determining, in an extrusion die, the bearing depth required in different parts of the die aperture to provide substantially uniform flow across the die aperture and also, in a preferred embodiment, provides a simple method of shaping the die to the required dimensions.

SUMMARY OF THE INVENTION

The invention makes use of the fact that when a flowable material is forced through an extrusion die in which the resistance to flow and extruding pressure vary in different parts of the die aperture, the leading surface or "nose", of the material being extruded deforms and that the extent of the deformation at any location is related to the resistance to flow and extrusion pressure at that location. In other words, in a part of the die aperture where the resistance to flow is comparatively low and/or the extrusion pressure is high the leading surface of the material will move ahead of the surface in another part of the die where the resistance to flow is greater and/or the extrusion pressure is lower.

According to the invention, therefore, a method of forming an extrusion die comprises forming an extrusion aperture in a die piece, forcing a flowable material at least partly through the extrusion aperture so that the leading surface of the material becomes deformed in the extrusion direction, and then reshaping the die piece in such a manner that the axial bearing depth of the extrusion aperture at any location around its periphery corresponds to the deformation of the leading surface of the flowable material at that location.

Thus, in an area where the deformation is small, indicating a high resistance to extrusion and/or low extrusion pressure, the reshaping of the die piece provides a correspondingly small axial bearing depth so as to reduce substantially the resistance to flow. In areas where there is considerable deformation of the flowable material, indicating low resistance to flow and/or high extrusion pressure, the axial bearing depth in the reshaped die piece is greater so that the resistance to flow is not reduced, or is reduced to a lesser extent. By this means the flow may be made substantially uniform over the whole of the die aperture.

The die piece is preferably so reshaped that the axial bearing depth of the extrusion aperture at any location around its periphery is equal to the displacement of the leading surface of the material with respect to a fixed datum plane. For example, the fixed datum plane may be a plane extending across the inlet to the extrusion aperture, at right angles to the extrusion direction.

The flowable material may be forced only partly through the extrusion aperture so as to contact a portion of the peripheral surface of the aperture lying between the inlet and a line intermediate the inlet and outlet. In this case the reshaping of the die piece may comprise removing die material from that portion of the peripheral surface of the aperture which lies between said intermediate line and the outlet, i.e. that portion not contacted by the flowable material, so that the effective axial bearing depth of the aperture at each peripheral location is the axial depth of that portion which is contacted by the flowable material.

The die material may be removed by a chemical or electro-etching process. The process may be carried out while the flowable material is still within the extrusion aperture, the material then serving to protect the surface it contacts from the effect of the etching chemical, in the case of a chemical etching process, or from the effect of the electro-etching process.

The invention includes within its scope an extrusion die formed by any of the methods referred to above, and also extrusions produced by use of such a die.

DETAILED DESCRIPTION OF THE PREFERRED EMBODIMENT

Figure 1:
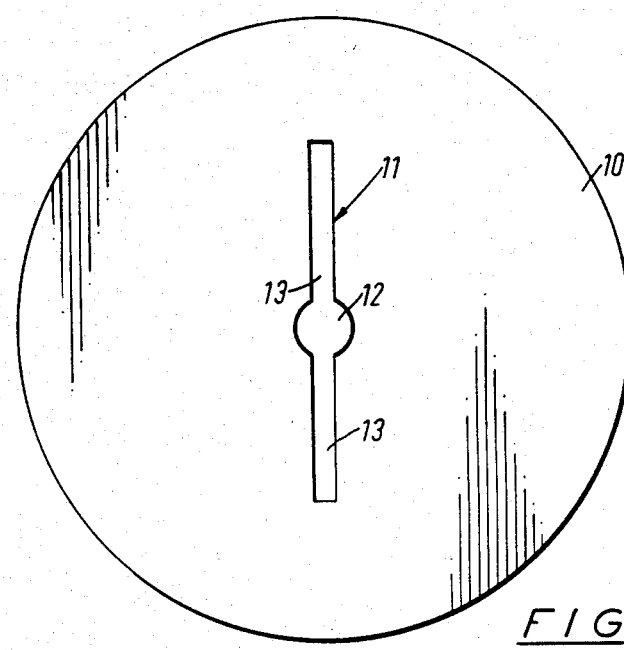
FIG. 1 is a diagrammatic representation of an extrusion die.

Referring to FIG. 1, the die piece 10 is formed with an extrusion aperture 11 comprising a central cylindrical portion 12 from which extend two narrower parallel-sided arm portions 13. It will be appreciated that FIG. 1 shows a very simple form of extrusion aperture for the purposes of illustration only and that the principles of the invention are applicable to extrusion apertures of any shape and complexity, including apertures for extruding hollow sections.

The dimensions of the aperture 11 are calculated in the usual way to allow for shrinkage and deflection of the die material during the extrusion process. The aperture will normally be electro-discharge machined in the die piece and then cleaned and polished.

Figure 2:
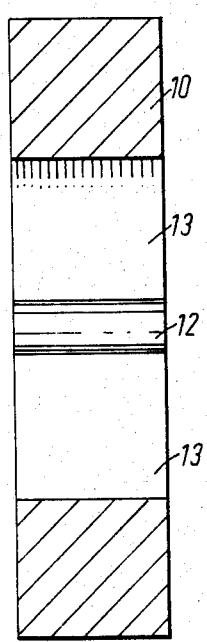
FIG. 2 is a diagrammatic vertical section through the die of FIG. 1.

As best seen in FIG. 2, the die piece 10 is of constant thickness so that, initially, the extrusion aperture is of constant axial bearing depth.

Figure 3:
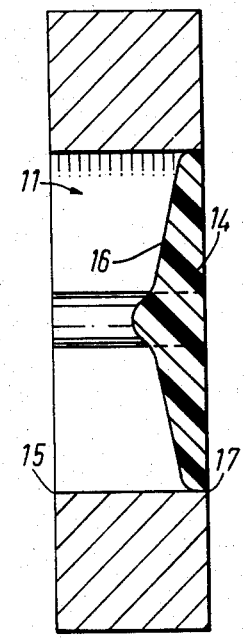
FIGS. 3, 4 and 5 illustrate stages in the method according to the invention.
Figure 4:
Figure 5:
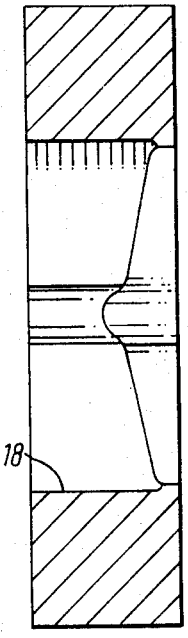

In use of the die the resistance to flow in the cylindrical portion 12 of the aperture will be less than the resistance to flow between the closely adjacent side walls of the arm portions 13. The resistance to flow at the outer ends of the arm portions 13 will be even greater due to the frictional resistance of the end wall of each arm. Furthermore, the extrusion pressure is likely to decrease with distance from the die center. Consequently material extruded through the die in the form shown in FIG. 2 would be subjected to non-uniform flow leading to undesirable internal stresses. FIGS. 3 to 5 illustrate the method of adjusting the axial bearing depth of the die aperture so as to give substantially uniform flow.

Referring to FIG. 3, a suitable compound 14 is forced partly into the extrusion aperture 11 by means of a piston (not shown) which simulates the action of an extrusion press. The piston is stopped when the compound 14 is observed approaching the open end or outlet 15 from the aperture. Alternatively, a probe may be located within the aperture to detect and indicate when the compound has been injected into the aperture to a predetermined extent. For example, the probe may be electrically vibrated, electrical means being provided to detect the change in frequency of vibration of the probe which occurs when it is contacted by the compound.

As may be seen in FIG. 3, due to varying extrusion pressure and varying resistance to flow in different parts of the die aperture, the leading surface of the compound 14 deforms in the axial direction, the part of the compound passing through the cylindrical portion 12 moving ahead of the part of the compound moving through the arm portions 13. Consequently, when the piston is stopped the peripheral edge of the leading surface of the compound 14 contacts the interior surface of the aperture 12 along a shaped line 16 intermediate the inlet 17 and outlet 15 from the extrusion aperture.

The axial deformation of the leading surface of the compound 14 at any location, represented by the distance between the line 16 and a datum plane containing the inlet 17, defines the required axial bearing depth for the extrusion aperture at that location. Consequently, the line 16 may be regarded as representing the required location of the effective outlet from the extrusion aperture.

Thus, the die may be reshaped simply by removing surface material from the interior of the extrusion aperture in the area between the line 16 and the outlet 15 so as to widen the aperture in that area and thus limit the effective bearing depth of the aperture to the area between the line 16 and the inlet 17.

The material may be removed in any suitable manner. For example, the line 16 could be scribed on the interior surface of the die, the compound removed and the excess material machined away. Alternatively and preferably however the material is removed by an acid etching process or an electro-etching process.

Although the compound 14 may be any appropriate flowable material it is, for the purposes of the acid-etching method to be described, preferably an acid resistant material. For example it may be a viscous acid-resistant printing ink of the kind conventionally used in the production of printed circuit boards. In this case the die piece, with the compound 14 still in place, may simply be placed in an acid bath, the exterior of the die first having been coated or covered with an acid resistant material.

The die remains in the acid bath for a period necessary to remove the required amount of material from the interior of the extrusion aperture between the surface of the compound 14 and the outlet 15. Typically material may be removed to a depth of the order of 15 to 20 thousandths of an inch. After the etching has been completed the die piece is removed from the acid bath and the compound 14 is removed.

In the case where the material is to be removed by an electro-etching method, the compound 14 must be an electrically non-conductive material, such as a non-conductive wax. The exterior of the die must also be coated or covered with a non-conductive layer, for example a layer of thin plastics film. The die is then immersed in a suitable electrolyte and acts as an anode, a separate cathode also being immersed in the electrolyte. The die and cathode remain in the electrolyte, and are subjected to an electric voltage, for a sufficiently long period to remove the required amount of material from the die and deposit it on the cathode. After the etching has been completed the die piece is removed from the electrolyte and the compound 14 is removed.

In either of the above etching processes, due to the etching away of part of the surface of the extrusion aperture, as indicated at 18 in FIG. 5, the effective bearing portion of the die is now only that portion which was protected by the compound 14 and which is of varying bearing depth. Since the bearing depth has been automatically adjusted according to the rate of flow through the untreated die piece, flow will now be substantially uniform over the whole of the extrusion aperture, thus substantially reducing the internal stresses in extrusions produced by the die.

Although the above-described method illustrates a very direct way of correlating the bearing depth to the deformation of the extrudable material, it will be appreciated that other, though less direct, methods of correlation fall within the scope of the invention. For example the dimensions of the deformed material in the position shown in FIG. 3 may be measured and used as the basis for any other form of reshaping of the die to give a varying depth in accordance with those dimensions.

Although in the method described the bearing depth is made exactly equal to the displacement of the leading surface of the extrudable material from a fixed datum, it may be preferable in some forms of die for other factors affecting flow to be taken into account by providing some mathematical relation, other than a direct equivalent, between the bearing depth and the correspondin dimension of the deformed material.

We claim:

1. A method of forming an extrusion die comprising forming an extrusion aperture in a die piece, forcing a flowable material at least partly through the extrusion aperture so that the leading surface of the material becomes deformed in the extrusion direction, and then reshaping the die piece in such a manner that the axial bearing depth of the extrusion aperture at any location around its periphery corresponds to the deformation of the leading surface of the flowable material at that location.

2. A method according to claim 1, wherein the die piece is so reshaped that the axial bearing depth of the extrusion aperture at any location around its periphery is equal to the displacement of the leading surface of the material with respect to a fixed datum plane.

3. A method according to claim 2, wherein the fixed datum plane is a plane extending across the inlet to the extrusion aperture, at right angles to the extrusion direction.

4. A method according to claim 1, wherein the flowable material is forced only partly through the extrusion aperture so as to contact a portion of the peripheral surface of the aperture lying between the inlet and a line intermediate the inlet and outlet, the reshaping of the die piece comprising removing die material from that portion of the peripheral surface of the aperture which lies between said intermediate line and the outlet so that the effective axial bearing depth of the aperture at each peripheral location is the axial depth of that portion which is contacted by the flowable material.

5. A method according to claim 4, wherein the die material is removed by a chemical etching process.

6. A method according to claim 5, wherein the chemical etching process is carried out while the flowable material is still within the extrusion aperture, the material being resistant to the chemical and serving to protect the surface it contacts from the effect of the etching chemical.

7. A method according to claim 4, wherein the die material is removed by an electro-etching method.

8. A method according to claim 7, wherein the electro-etching process is carried out while the flowable material is still within the extrusion aperture, the material being electrically non-conductive and serving to protect the surface it contacts from electro-etching.

9. An extrusion die when formed by a method according to claim 1.

10. An extruded section when produced by an extrusion die according to claim 9.

* * * * *